O. W. ALLISON.
CAR BRAKE.
APPLICATION FILED SEPT. 10, 1915.
1,190,073.
Patented July 4, 1916.
2 SHEETS—SHEET 1.
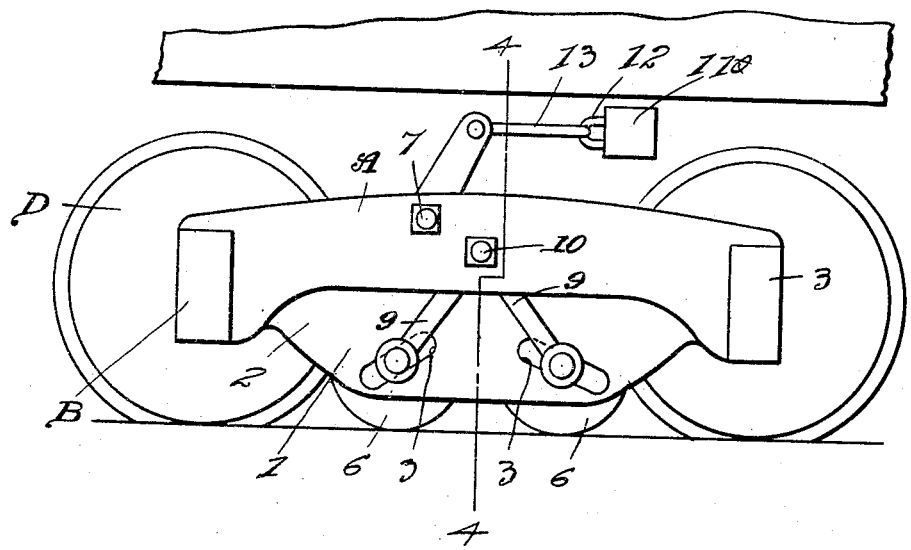
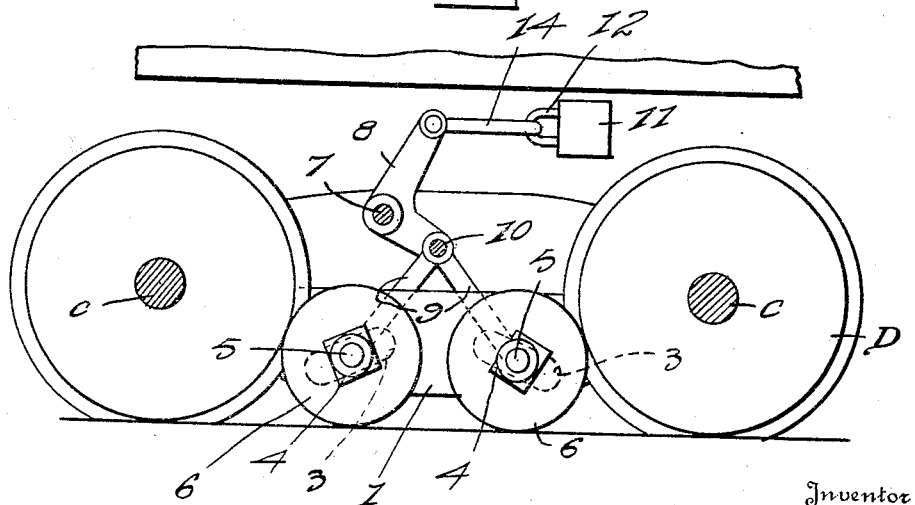
Witnesses
Inventor
O. W. Allison
By
Attorney

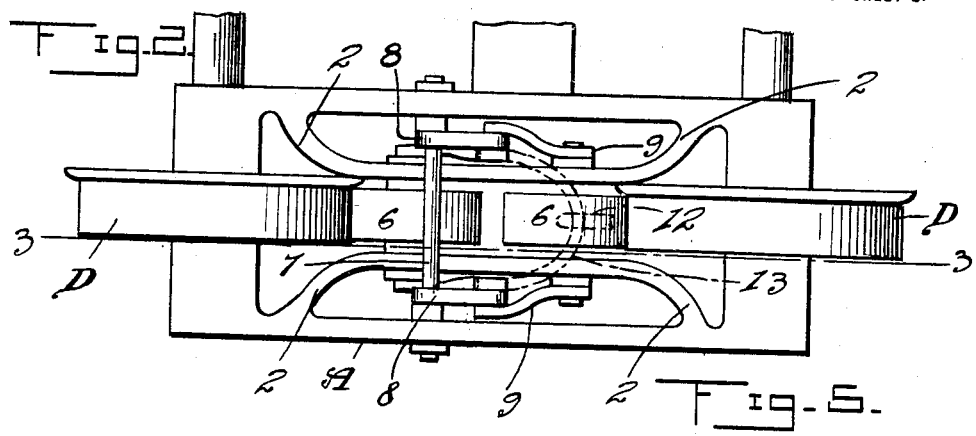
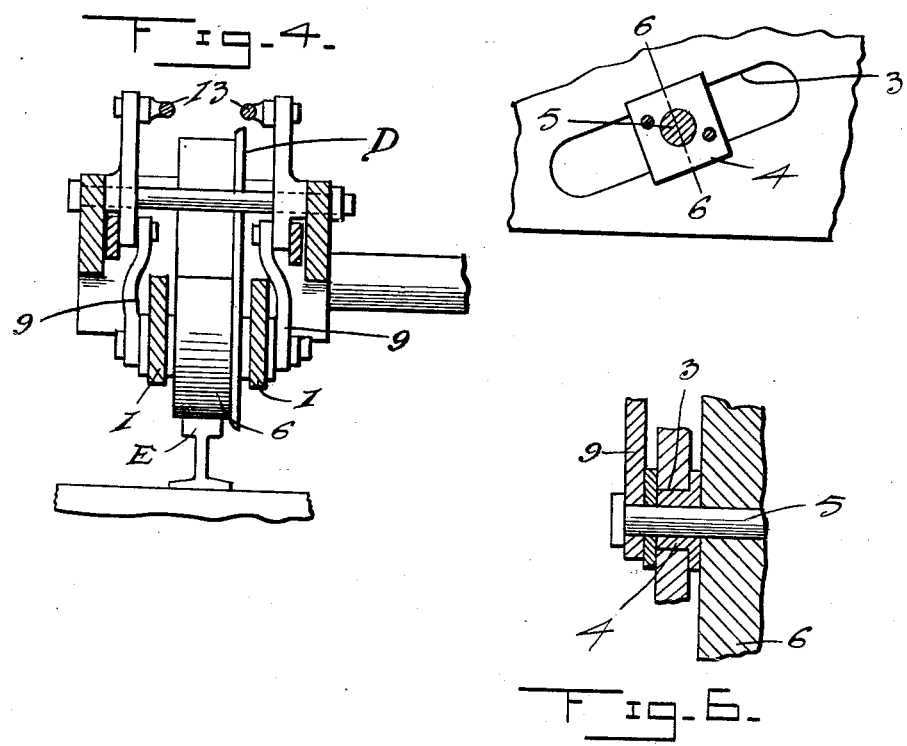
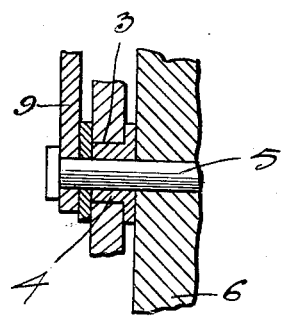

UNITED STATES PATENT OFFICE.

OSWALD W. ALLISON, OF SEATTLE, WASHINGTON.

CAR-BRAKE.

1,190,073.  Specification of Letters Patent.  Patented July 4, 1916.

Application filed September 10, 1915. Serial No. 50,080.

*To all whom it may concern:*

Be it known that I, OSWALD W. ALLISON, a citizen of the United States, residing at Seattle, in the county of King and State of Washington, have invented certain new and useful Improvements in Car-Brakes; and I do hereby declare the following to be a full, clear, and exact description of the invention, such as will enable others skilled in the art to which it appertains to make and use the same.

The primary object of this invention is to improve the construction of car brakes, by providing a rotating element to take the place of the ordinary brake shoe, and which, when brought into engagement with the wheels of a car truck, will apply a load thereto and also rotate therewith, so that the car can be gradually brought to a stop and liability of the truck wheels being rendered flat, prevented.

Another object of the invention is to provide a brake, for carrying out the above object, and which, when in braking position, will contact with the truck wheels and also engage the rails of the track.

A further object of the invention is to provide a brake of the type above referred to, which will be simple in construction, cheap to manufacture, will be durable and efficient in operation, which can be applied to any type of car.

Other objects will appear and be better understood from that embodiment of my invention of which the following is a specification, reference being had to the accompanying drawings forming a part thereof, in which:—

Figure 1 is a side elevation of a car truck with the improved braking mechanism applied thereto, Fig. 2 is a top plan view thereof, Fig. 3 is a vertical section taken on the line 3—3 of Fig. 2, Fig. 4 is a vertical section, taken on the line 4—4 of Fig. 1, Fig. 5 is a detail side elevation of one of the plates which is associated with the car truck frame, and Fig. 6 is a detail sectional view taken on the line 6—6 of Fig. 5.

Referring to the drawings, the letter A designates the sides of a car truck frame, of ordinary construction, the opposite ends of which have mounted thereon the boxes B—B for the axles C—C of the wheels D.

The brake mechanism consists of a pair of parallel side plates 1—1, which are disposed below the sides of the truck frame and located inwardly of the sides A of the frame, as shown in Fig. 2, and have their opposite ends arranged in upwardly diverging relation, as shown at 2, and terminally secured in any suitable manner to the sides A of the truck frame. Each of the plates 1 has formed therein a pair of upwardly converging slots 3—3, the slots in one plate being alined with the slots in the opposite plate, and the said slots have mounted therein slidable boxes 4—4 for the opposite ends of transverse shafts 5—5. The shafts 5—5 carry companion brake wheels 6—6, the said wheels being so positioned with respect to the wheels D—D, that when the shafts are moved downwardly in the slots 3—3, the brake wheels will contact with the adjacent wheels D—D and also with the track rails, designated E, and effect a braking action.

Extending transversely of the truck frame, and located at a point offset from the center of the truck frame, is a shaft 7. The opposite ends of the shaft 7 are fixed within the sides A—A of the truck frame, and the said ends of the shaft 7 have mounted thereon, L-shaped bell crank levers 8—8, the said levers being located adjacent the inner surfaces of the sides of the truck frame, and spaced therefrom.

Each of the side places A has located at its outer side, a pair of upwardly converging link members 9—9, the lower ends of each pair of link members being pivotally connected with the adjacent ends of the slidable shafts 5—5, and the upper ends of each pair straddle the short arm of the adjacent L-shaped bell crank lever, and are pivotally secured thereto by means of a pivot pin 10.

Disposed upon the truck frame, is a brake beam 11, the inner side of which has centrally mounted thereon an eye 12. The eye 12 has associated therewith a horizontally disposed yoke member 13, the side portions of which are arranged in diverging relation, toward the bell crank levers, and are terminally secured to the long arm of the bell crank levers, as shown in Figs. 1 and 2 of the drawings.

When the brake wheels 6—6 are in normal position, they are spaced above the rails E and away from the wheels D. When the brake beam 11 is drawn forwardly, by the brake operating mechanism, the bell crank levers 8—8 will be rocked, and through the medium of the link members 9—9 slide the shafts 5 downwardly toward the lower ends of the slots 3, resulting in the brake wheels 6—6 being forced against the wheels D and the track rails E. The frictional engagement between the brake wheels 6—6 and the wheels D and the track rails, will cause the brake wheels to rotate, and by virtue of the pressure of the brake wheels against the wheels D, will cause a load to be applied to the wheels D, resulting in the gradual stopping of the car. With this construction, liability of the wheels D being rendered flat, will be overcome, as there are no stationary parts for the tread surfaces of wheels D to scrape against.

Having thus described my invention, what I claim as new is:—

1. In a car brake, the combination with a car truck and wheels therefor, of relatively spaced plates carried by the car truck and disposed below the same, each of the plates having upwardly converging slots therein, shafts extending transversely of the car truck frame and having the opposite ends slidably mounted in the converging slots, means for sliding the shafts in the slots, and brake wheels carried by the shafts and adapted when the shafts are slid in one direction to engage the wheels of the truck, for the purpose specified.

2. In a car brake, the combination with a car truck and wheels therefor, of a shaft extending transversely of the car truck and having its opposite end fixed within the sides of the truck, bell crank levers mounted on the shafts, brake wheels swingingly mounted within the car truck, means for connecting the brake wheels to one arm of each of the bell crank levers, a brake beam disposed above the car truck, and means for connecting the brake beam to the other arms on the bell crank lever, whereby to effect movement of the brake wheels in the direction of the car truck wheels, when the brake beam is moved in one direction.

3. In a car brake, the combination with a car truck and wheel therefor and the track rails, of bell crank levers pivoted within the car truck, a brake beam, means connecting the brake beam to one arm of each of the bell crank levers, brake wheels located within the car truck and normally held from engagement with the car truck wheels and the track rails, upwardly converging link members located within the car truck and having their lower ends providing journals for the brake wheels, and the upper ends connected to the other arms of the bell crank levers, the said link members being adapted, when the bell crank levers are operated, to move the brake wheels into engagement with the car truck wheels and the track rails.

In testimony whereof I affix my signature in presence of two witnesses.

OSWALD W. ALLISON.

Witnesses:
  JOHN E. BURKHEIMER,
  D. M. EGGLESTON.

Copies of this patent may be obtained for five cents each, by addressing the "Commissioner of Patents, Washington, D. C."